United States Patent

Nakahori

[11] Patent Number: 6,141,899
[45] Date of Patent: Nov. 7, 2000

[54] FISHLINE GUIDE MEMBER AND MANUFACTURING METHOD THEREOF

[75] Inventor: Yasuhiro Nakahori, Kagoshima, Japan

[73] Assignee: Kyocera Corporation, Kyoto, Japan

[21] Appl. No.: 09/049,308

[22] Filed: Mar. 27, 1998

[30] Foreign Application Priority Data

Mar. 28, 1997 [JP] Japan .................................. 9-078475

[51] Int. Cl.$^7$ .............................................. A01K 87/04
[52] U.S. Cl. ................................................................ 43/24
[58] Field of Search ........................... 43/24; 264/42–44, 264/628

[56] References Cited

U.S. PATENT DOCUMENTS

| | | | |
|---|---|---|---|
| 3,402,500 | 9/1968 | Nelson | 43/24 |
| 3,680,382 | 8/1972 | Vaiden | 73/343 |
| 4,011,680 | 3/1977 | Rienzo, Sr. | 43/24 |
| 4,141,132 | 2/1979 | Ohmura | 29/432 |
| 4,156,319 | 5/1979 | Wood | 43/24 |
| 4,174,583 | 11/1979 | Ohmura | 43/24 |
| 4,186,508 | 2/1980 | Howard | 43/24 |
| 4,287,678 | 9/1981 | Yamamoto | 43/24 |
| 4,428,140 | 1/1984 | Yamamoto | 43/24 |
| 4,681,861 | 7/1987 | Saito | 501/89 |
| 4,777,153 | 10/1988 | Sonuparlak et al. | 501/82 |
| 4,829,027 | 5/1989 | Cutler et al. | 501/89 |
| 5,177,892 | 1/1993 | Ohmura | 43/24 |
| 5,219,802 | 6/1993 | Hsiao et al. | 501/81 |
| 5,575,103 | 11/1996 | Hare | 43/24 |
| 5,705,118 | 1/1998 | Hayes et al. | 264/432 |
| 5,855,841 | 1/1999 | Trigg et al. | 264/654 |
| 5,855,842 | 1/1999 | Trigg et al. | 264/654 |

FOREIGN PATENT DOCUMENTS

| | | | |
|---|---|---|---|
| 48029 | 3/1982 | European Pat. Off. | 43/24 |
| 2427154 | 12/1975 | Germany | 43/24 |
| 2525208 | 1/1976 | Germany | 43/24 |
| 111630 | 7/1983 | Japan | 43/24 |
| 3155736 | 7/1991 | Japan | 43/24 |
| 0108569 | 5/1993 | Japan . | |
| 40/5153887 | 6/1993 | Japan . | |
| 405153887 | 6/1993 | Japan | 43/24 |
| 0727815 | 1/1996 | Japan . | |
| 600753 | 6/1978 | Switzerland | 43/24 |
| 27442 | 9/1909 | United Kingdom | 43/24 |
| 8448 | 4/1911 | United Kingdom | 43/24 |
| 1132624 | 11/1968 | United Kingdom | 43/24 |
| 2082032 | 3/1982 | United Kingdom | 43/24 |

OTHER PUBLICATIONS

Encyclopedia of Physics, "friction", pp. 418 and 419, Jan. 1991.
Introduction to Solid State Physics, p. 24, Jan. 1986.

*Primary Examiner*—Michael J. Carone
*Assistant Examiner*—Fredrick T. French, III
*Attorney, Agent, or Firm*—Hogan & Hartson, LLP

[57] ABSTRACT

In the fishline guide member 1, frictional resistance with the fishline is reduced and prevents damage to the fishline, with high strength being maintained. The fishline guide member 1 comprises a fishline guide surface 2 formed on the surface of ceramics primarily composed with silicon carbide. Microscopic pores are formed only in the vicinity of the guide surface 2.

7 Claims, 3 Drawing Sheets

FISHLINE GUIDE MEMBER AND MANUFACTURING METHOD THEREOF

BACKGROUND OF THE INVENTION

The present invention relates to a fishline guide member for installing to a fishing rod and guiding a fishline.

Conventionally, in fishing using a reel, a plurality of guide members in the form of ring are equipped to a fishing rod to guide a fishline and these guide members have been generally made of resin and/or metal. However, when fish is hooked, strong force is applied to the fishline and causes the fishline to slide on the guide members, requiring superb wear resistance of the guide members. Resin or metal guide members provide poor strength, wear resistance, slidability, and other properties, and tend to damage the fishline, and have problems of easy breakage during use in a comparatively short time.

Therefore, fishline guide members using ceramics in place of resin or metal are proposed. For example, in Japanese Patent Publication No. Sho 63-41532, there disclosed are fishline guide members made of zirconia ceramics and in Japanese Non-examined Patent Publication No. Hei 5-153887, there disclosed are fishline guide members made of silicon carbide ceramics, respectively. Because these ceramic fishline guide members provide high strength and excellent wear resistance and slidability, they can be used satisfactorily over a long period of time.

On the other hand, in the recent fishing industry, fishing using lures has been remarkably gaining popularity. In lure fishing, because the number of casting and rewinding of lures is so many and thin fishlines are used as well as light lures are used, load applied to fishlines increases. Therefore, in order to reduce this load, the frictional resistance between the guide members and the fishline must be further reduced.

Now, in the fishline guide members made of ceramics, the frictional resistance with fishlines is unable to be reduced, and the properties as required above were unable to be satisfied.

That is, because the conventional ceramic guide members are produced by forming the material comprising alumina ($Al_2O_3$), zirconia ($ZrO_2$), silicon carbide (SiC), and other main components as well as sintering aids, firing to achieve densification, and polishing the surface, the guide surface of the fishline is smooth and free of any pores. Consequently, the contact area between the fishline and the guide surface increases, and it is unable to prevent the frictional resistance from increasing.

To solve this problem, it is possible to consider, for example, to increase surface roughness of the guide surface of the ceramics fishline guide member or to decrease the contact area with the fishline by forming the guide member with ceramics porous material and allowing pores to exist on the surface. However, increasing the surface roughness of the guide surface causes the fishline to easily break, and making the guide member porous lowers the strength, creating another problem of easy breakage of the guide member when the fishing rod comes in contact with rocks, concrete, etc. when the fishing rod is being used.

Therefore, this invention relates to a fishline guide member with the fishline guide surface formed on the ceramics surface primarily composed of silicon carbide, which is characterized by having pores in the vicinity of the guide surface.

That is, the guide member proper is formed with dense ceramics virtually free of pores but with pores existing only in the vicinity of the guide surface, thereby reducing the contact area between the guide surface and the fishline and reducing the frictional resistance with high strength maintained.

This invention is characterized by 0.2–5.0% porosity in the vicinity of the guide surface, 10 μm or less average porosity diameter, and 0.4 or less frictional coefficient with the nylon fishline.

In addition, this invention is characterized by silicon carbide ceramics that contain silicon carbide as the main component and $Al_2O_3$, $Y_2O_3$, and other metal oxides as sintering aids and that are formed by liquid-phase sintering.

This invention is also characterized by a manufacturing method of fishline guide member comprising a process for forming the material containing silicon carbide and metal oxides such as $Al_2O_3$, $Y_2O_3$, etc. into a specified profile, firing the material at a temperature ranging from 1800 to 2200° C., decomposing the liquid-phase components on the surface to form pores, and then, polishing the surface to form the guide surface of the fishline.

That is, the silicon carbide ceramics containing metal oxides and liquid-phase sintered components are capable of having the liquid-phase components on the surface decomposed and pores generated only on the surface by adjusting the sintering conditions, and the fishline guide members as described above are able to be easily manufactured.

PREFERRED EMBODIMENT OF THE DRAWINGS

Referring now to drawings, the embodiments of the invention will be described in detail hereinafter.

Figure 1A:
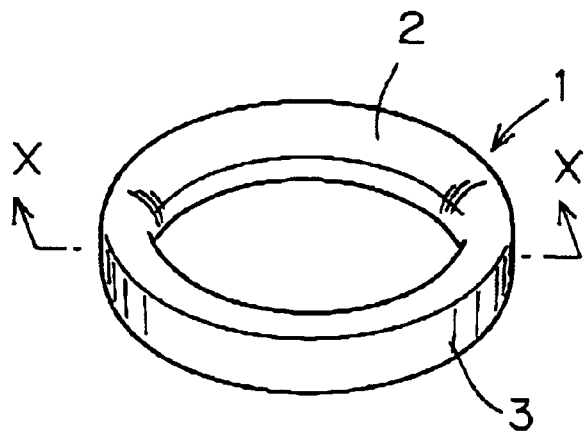
FIG. 1(*a*) is a perspective view of a fishline guide member according to the invention and (*b*) is a cross-sectional view taken on line X-Y of (*a*)
Figure 1B:
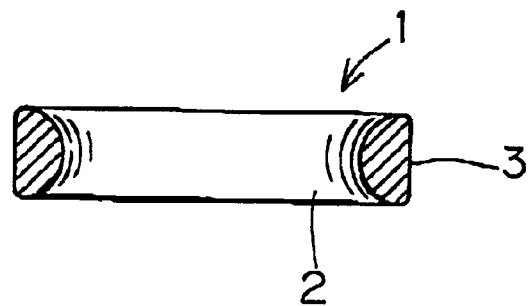

The fishline guide member 1 shown in FIG. 1 is a ring-like member comprising ceramics with silicon carbide as a main component, and possesses a flat outer circumferential surface 3, and the inner circumferential surface side is formed in a smooth curved guide surface 2. This guide member 1 has the outer circumferential surface 3 fixed with a metal or resin support member and is installed to a fishing rod (not illustrated). And by allowing the guide surface 2 to slide with the fishline, the guide member guides the fishline.

Figure 2A:
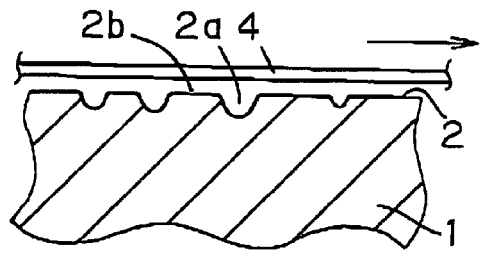
FIG. 2(*a*) is a grossly enlarged sectional view showing a guide surface of the fishline guide member according to the invention and (*b*) is a grossly enlarged sectional view of a guide surface of the conventional fishline guide member.
Figure 2B:
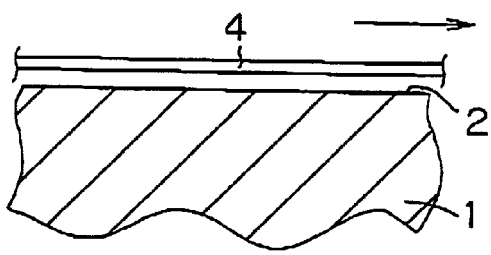

As shown in FIG. 2(*a*), on the guide surface 2, microscopic pores 2*a* exist, and consequently, when the fishline 4 slides, the contact area is able to be decreased to reduce frictional resistance. Because between pores 2*a*, a smooth flat surface 2*b* exists, and the edge portion of each pore 2*a* is prepared into a smooth curved profile, there is no fear of damaging the fishline 4. On the other hand, as shown in FIG. 2(*b*), since the guide surface 2 of the conventional guide member 1 is prepared into a smooth surface free of pores, the contact area with the fishline 4 is large and the frictional resistance is unable to be reduced.

In this way, the guide member 1 of this invention has its inside composed with dense ceramics virtually free of pores, and microscopic pores 2a are allowed to exist only at the nearby surface of the guide surface 2 of the relevant surface. Consequently, the frictional resistance of fishline 4 can be reduced as described above with the strength of the guide member 1 properly maintained to a high level.

Allowing pores 2a to exist only at the nearby surface of the guide surface 2 means that pores 2a are not only open to the guide surface 2a but also exist in the range of a specified depth from the guide surface 2a. Consequently, even when the guide surface 2 slightly wears during application, pores 2a exist in the same manner and the frictional resistance can be maintained to a low level.

The pores 2a existing in the vicinity of the guide surface 2 has 0.2 to 5.0% porosity and has the average pore diameter in the range of 10 $\mu$m or lower. This is because when the porosity is less than 0.2%, effects of reducing the frictional resistance of fishline 4 described above is small, and when either the porosity exceeds 5.0% or the mean pore diameter exceeds 10 $\mu$m, the fishline 4 is not only likely to be easily damaged but also acquires dull color tone and loses decorativeness. The average pore diameter is preferably 8 $\mu$m or less, and more suitably, the maximum pore diameter is 30 $\mu$m or less.

The inside of the guide member 1 virtually being free of pores means that the porosity at the center portion of the guide member 1 is less than 0.2%.

The porosity, average pore diameter, and maximum pore diameter are measured by image analysis, and the specific method is shown as follows. First of all, to measure the vicinity of the guide surface 2, since the guide surface 2 itself is curved, the guide surface 2 is ground by 0.5 mm to produce a flat surface, and the area 100 $\mu$m by 100 $\mu$m is measured by the image analyzer on this flat surface, and the diameter corresponding to the circle of the existing pore and the possessive area of the pore are found. This kind of measurement is carried out at three different places, and the average value of the diameter corresponding to circle of the pore is designated to the average pore diameter, the maximum value to the maximum pore diameter, and the average of the possessive area ratio of the pore to the porosity. When the inside of the guide member 1 is measured, the ruptured surface is ground and the measurement similar to the above should be carried out.

Now description will be made on the silicon carbide ceramics that form the guide member 1 of this invention.

In general, to fabricate silicon carbide ceramics, there are two cases: solid-phase sintering and liquid-phase sintering. Solid-phase sintering is to form and fire the material of silicon carbide (SiC), the main component, with sintering aids such as boron (B), carbon (C), etc. added and to bond and sinter SiC crystal grains at the solid phase. Liquid-phase sintering is to form and fire the material of silicon carbide (SiC) with sintering aids comprising metal oxides such as alumina ($Al_2O_3$), yttria ($Y_2O_3$), etc. added and to bond and sinter the SiC crystal grains at the glassy grain boundary layer (liquid phase) comprising the metal oxides.

This invention is characterized by particularly using the liquid-phase sintered silicon carbide ceramics for the fishline guide member 1. This is because the liquid-phase sintered silicon carbide ceramics are capable to decompose the liquid-phase components comprising the metal oxides on the surface portion and to allow pores to exist on the surface only if conditions are adjusted at the time of firing, and is able to easily fabricate the guide member 1 with pores 2a only in the vicinity of the guide surface 2 as described above.

In additions, the liquid-phase sintered silicon carbide ceramics are able to improve toughness with high hardness and thermal conductivity maintained as compared to other ceramics. Consequently, they provide superb wear resistance and heat radiation capabilities, and can prevent breakage of the guide member 1 itself. To achieve this kind of effect, the silicon carbide ceramics preferably provide 1500 kg/mm$^2$ or higher Vickers hardness, 4 MPa$\sqrt{m}$ or higher fracture toughness $K_{1c}$, and 40 W/m·k or higher thermal conductivity.

For the metal oxides contained in the carbon silicate ceramics, it is particularly preferable to contain 1–7 wt % of $Al_2O_3$ and 0.1–5 wt % of oxides of periodic table group 3a elements such as $Y_2O_3$, $CeO_2$, etc. These metal oxides improve the sintering capability of silicon carbide ceramics as sintering aids and at the same time act to form glassy boundary layer (liquid phase) between silicon carbide grains in the sintered compact to prevent propagation of cracks and to improve toughness of ceramics.

Next discussion will be made on the manufacturing method of the guide member 1 of the invention.

Using the material powders which are prepared by adding metal oxides to the silicon carbide powders as sintering aids, and mixing and pulverizing the mixture, ring form compacts as shown in FIG. 1 are formed by the powder press molding method or other known method. This molding is fired in the temperature range from 1800 to 2200° C. under pressure-free state. In this event, the liquid-phase component comprising the added metal oxides decompose at the surface and are fired in such a condition to form microscopic pores. The sintered compacts obtained are fluidizing-polished such as barrel polishing, etc. to break edges of pores 2a existing on the surface and the smooth guide surface 2 is formed. Lastly, the outer circumferential surface 3 is ground to obtain the guide member 1 of the invention.

In the above-mentioned manufacturing method, adjusting the grain size and firing conditions (temperature, time) of the material powders, it is possible to easily adjust the maximum diameter of pores or the porosity existing in the vicinity of the guide surface 2.

Table 1 shows the characteristics of various ceramics. In Table 1, SiC-E is solid-phase-sintered silicon carbide ceramics, whose toughness value $K_{1c}$ is as small as 3.4 MPa $\sqrt{m}$. As against this, the liquid-phase-sintered silicon carbide ceramics (SiC-A to D) provide excellent characteristics: 1900 kg/mm$^2$ or higher Vickers hardness, 5.0 MPa$\sqrt{m}$ or higher fracture toughness $K_{1c}$, and 60 W/m·K or higher thermal conductivity.

TABLE 1

|  | Material | Additives (wt %) | Density (g/cm$^2$) | Three-point bending strength (kg/cm$^2$) | Fracture toughness K$_{1c}$ (MPa√m) | Vickers hardness (kg/mm$^2$) | Thermal conductivity (W/mk) |
|---|---|---|---|---|---|---|---|
| The invention | SiC-A | Al$_2$O$_3$ 2.1<br>Y$_2$O$_3$ 0.2 | 3.19 | 50 | 5.0 | 1900 | 63 |
|  | SiC-B | Al$_2$O$_3$ 3.7<br>Y$_2$O$_3$ 0.7 | 3.21 | 50 | 5.4 | 2070 | 63 |
|  | SiC-C | Al$_2$O$_3$ 4.3<br>Y$_2$O$_3$ 1.8 | 3.20 | 56 | 5.5 | 2000 | 63 |
|  | SiC-D | Al$_2$O$_3$ 6.2<br>CeO$_2$ 5.0 | 3.18 | 60 | 5.8 | 1900 | 63 |
| Comparision example | SiC-E | B, C | 3.0 | 50 | 3.4 | 2100 | 71 |
|  | Si$_3$N$_4$ | Al$_2$O$_3$, Y$_2$O$_3$ | 3.2 | 60 | 5.7 | 1400 | 21 |
|  | ZrO$_3$ | Y$_2$O$_3$ | 5.7 | 65 | 9.0 | 1250 | 4 |
|  | Al$_2$O$_3$ | SiO$_2$, MgO | 3.8 | 31 | 3.5 | 1650 | 25 |

EMBODIMENTS

Using silicon carbide ceramics comprising SiC-B in Table 1, guide members 1 shown in FIG. 1 were fabricated. The guide member 1 measures 14.35 mm in outside diameter, 10.6 mm in inside diameter, and 1.35 mm in curvature radius of the guide surface 2, and by varying the firing conditions, guide members with different porosities at the vicinity of the guide surface 2 were prepared.

Figure 3:
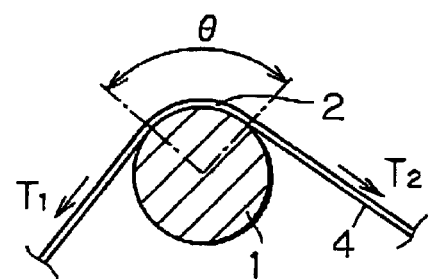
FIG. 3 is an illustration to explain the measuring method of frictional coefficient of the fishline guide member.

Using relevant guide members 1, the frictional coefficient was measured. Specifically, as shown in FIG. 3, using nylon fishline No. 2 for the fishline 4, the fishline was allowed to travel at the traveling speed 50 m/min, at 90° for the contact angle θ with the guide member 1, and at 20 g for tension T$_1$ of the fishline on the side entering the guide member 1, and the tension T$_2$ of the fishline on the side coming out of the guide member 1 was measured, $$T_2 = T_1 exp(\mu\theta) \quad \text{[Amonton Law]}$$

and based on this, the frictional coefficient μ was found.

Figure 4:
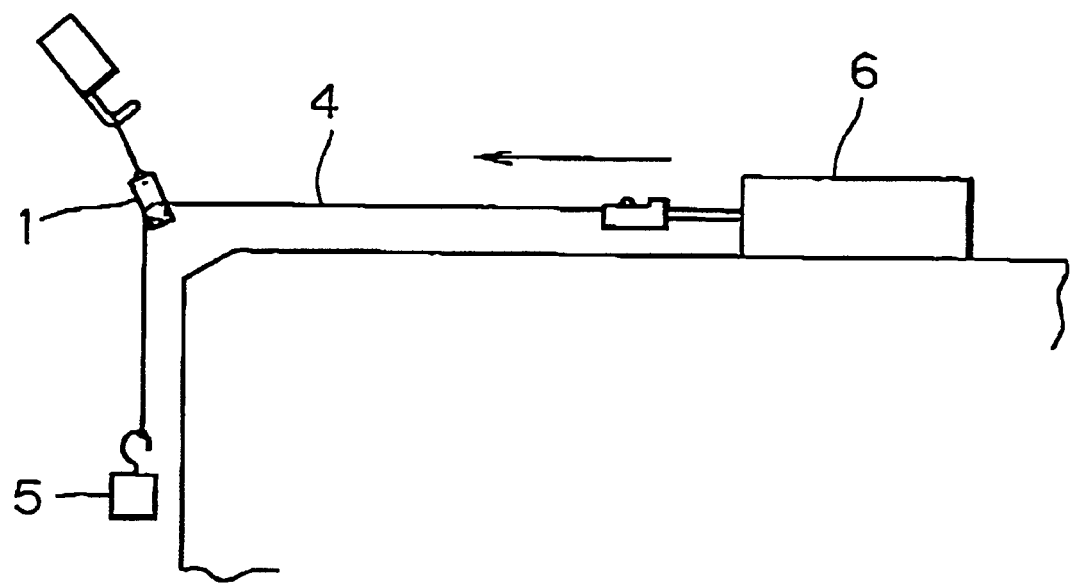
FIG. 4 is an illustration to explain the heating test of the fishline guide member.

Then, using each of the guide members 1, the heating test was carried out. Specifically, as shown in FIG. 4, the fishline 4 was passed through the guide member 1, a 4.5 kg weight 5 was hung in the vertical direction, and the fishline 4 extended in the horizontal direction was connected to the cylinder 6. With this cylinder 6, the guide member 1 and the fishline 4 were slid 700 times at a rate of one round trip per 3 seconds in 300 mm stroke, and the number of times before the fishline 4 broke was measured.

The results are shown in Table 2. The porosity in Table 2 means the possessive area ratio of the pores measured by the image analyzer using the flat surface ground by 0.5 mm from the guide surface 2 by the previously described method.

Based on the results in Table 2, in test piece No. 1 with the porosity less than 0.2%, the fishline 4 broke at the number of slides less than 700 times in the heating test because it provides high frictional coefficient and high frictional resistance. The frictional coefficient decreases as the porosity increases, but when the porosity exceeds 4%, the frictional coefficient conversely increases, and in test piece No. 7 with the porosity more than 5.0%, since the fishline 4 is subject to damage by the edge of pore 2a, the fishline 4 broke at the number of slides less than 700 times in the heating test.

As against these, in the embodiments of the invention in which the porosity ranges from 0.2 to 5.0%, the frictional coefficient is 0.4 or less and the breakage of fishline did not occur at the number of slides of 700 times in the heating test.

TABLE 2

| No. | Porosity in the vicinity of guide surface (%) | Frictional coefficient | Results of heating test |
|---|---|---|---|
| *1 | 0.07 | 0.51 | Fishline broke at 628 times. |
| 2 | 0.2 | 0.38 | Fishline did not break at 700 times. |
| 3 | 1.1 | 0.32 | Fishline did not break at 700 times. |
| 4 | 2.3 | 0.31 | Fishiine did not break at 700 times. |
| 5 | 3.7 | 0.28 | Fishline did not break at 700 times. |
| 6 | 4.8 | 0.34 | Fishline did not break at 700 times. |
| *7 | 5.9 | 0.38 | Fishline broke at 557 times. |

*is outside of the invention.

Next, same as the above, guide members 1 with the porosity about 1.0% in the vicinity of the guide surface 2 and with varying average pore diameters were fabricated, and the above-mentioned heating tests were carried out.

The results are shown in Table 3. The average pore diameter means the mean value of the circle equivalent diameter of the pore measured with the image analyzer using the flat surface ground by 0.5 mm from the guide surface 2 by the method described above.

Table 3 indicates that the guide surface whose mean pore diameter exceeds 10 μm (No. 6) tends to damage the fishline 4 with the edge of pore 2a, and fishline broke at slides less than 300 times in the heating test. As against this, in the embodiments of the invention whose mean pore diameter is 10 μm or less (No. 1–5), the number of slides before fishline breakage occurs in the heating test can be increased, and in particular, when the average pore diameter is set to 8 μm or lower (No. 1–4), the number of slides before fishline breakage occurs can be increased to 450 or more.

TABLE 3

| No. | Average pore diameter in the vicinity of guide surface (μm) | Results of heating test |
|---|---|---|
| 1 | 3.8 | Fishline did not break at 700 times. |
| 2 | 4.4 | Fishline did not break at 700 times. |
| 3 | 6.1 | Fishline broke at 627 times. |
| 4 | 7.9 | Fishline broke at 473 times. |
| 5 | 8.9 | Fishline broke at 362 times. |
| *6 | 11.2 | Fishline broke at 245 times. |

The fishline guide member 1 is not restricted to a circle, can form an ellipse. In this case, long diameter X from 1 to 25 mm, at the ratio of short diameter Y to long diameter X 1.15 Y≦X≦2.0Y, this elliptic fishline guide member is installed to a fishing rod inclined at 30~40 degrees for the axis direction of the fishing rod, as the result, the fishline can be prevented from twining coil round, the fishline can be improved fly distance and control ability.

As described above, in the fishline guide member with a fishline guide surface formed on the ceramics surface primarily composed with silicon carbide, it is possible to reduce the contact area between the guide surface and fishline and to reduce the frictional resistance with high strength maintained by possessing pores in the vicinity of the relevant guide surface. In addition, because the guide surface is in the condition in which pores exist partially on the flat surface, it is also possible to prevent damage to fishline.

Furthermore, the silicon carbide ceramics secure excellent wear resistance, heat radiation capability, etc., and can provide the fishline guide member that can be satisfactorily used over a long period of time free of fishline breakage, etc.

According to this invention, it is possible to easily fabricate the fishline guide member that has pores only in the vicinity of the guide surface as described above by fabricating the fishline guide member from the process that forms the fishline guide surface by polishing the surface, after generating the pores by decomposing the liquid-phase component of the surface as well as liquid-phase sintering by forming materials containing silicon carbide and metallic oxides such as $Al_2O_3$, $Y_2O_3$, etc. into a specified shape and firing it at temperature ranging from 1800 to 2200° C.

What is claimed is:

1. A fishline guide member of ceramic composition primarily composed of silicon carbide and having a fishline guide surface, wherein pores exist in a vicinity of the guide surface, and an inside of the guide member is virtually free of pores.

2. A fishline guide member recited in claim 1 wherein the porosity in the vicinity of the guide surface is 0.2–5.0% and the average pore diameter of the pores in the vicinity of the guide surface is 10 μm or less, and the kinetic frictional coefficient between the guide surface and a nylon fishline is 0.4 or less.

3. A fishline guide member recited in claim 1 wherein the ceramic composition is comprised of ceramics containing silicon carbide as a primary component, and $Al_2O_3$ and at least one oxide of a metal belonging to Group 3a of the periodic table as sintering aids, the silicon carbide ceramics being formed by liquid-phase sintering.

4. A fishline guide member of ceramic composition primarily composed of silicon carbide and having a fishline guide surface, the ceramic having a higher porosity in a vicinity of the guide surface than at an inside of the guide member.

5. The fishline guide member of claim 4, wherein the porosity in the vicinity of the guide surface is between about 0.2 to 5% and the porosity at the inside of the guide member is less than about 0.2%.

6. The fishline guide member of claim 4, wherein the porosity in the vicinity of the guide surface is 0.2–5.0% and the average pore diameter of the pores in the vicinity of the guide surface is 10 μm or less, and the kinetic frictional coefficient between the guide surface and a nylon fishline is 0.4 or less.

7. The fishline guide member of claim 4, wherein the ceramic composition is comprised of ceramics containing silicon carbide as a primary component, and $Al_2O_3$ and at least one oxide of a metal belonging to Group 3a of the periodic table as sintering aids, the silicon carbide ceramics being formed by liquid-phase sintering.

* * * * *